US010332663B2

(12) United States Patent
Cho et al.

(10) Patent No.: US 10,332,663 B2
(45) Date of Patent: Jun. 25, 2019

(54) COIL MODULE AND WIRELESS POWER RECEIVER USING THE SAME

(71) Applicant: Samsung Electro-Mechanics Co., Ltd., Suwon-si (KR)

(72) Inventors: Hyung Wook Cho, Suwon-si (KR); Si Hyung Kim, Suwon-si (KR); Sung Heum Park, Suwon-si (KR); Hee Seung Kim, Suwon-si (KR); Ki Won Chang, Suwon-si (KR); Jae Suk Sung, Suwon-si (KR); Chang Mok Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 174 days.

(21) Appl. No.: 15/420,992

(22) Filed: Jan. 31, 2017

(65) Prior Publication Data

US 2017/0229900 A1  Aug. 10, 2017

(30) Foreign Application Priority Data

Feb. 5, 2016 (KR) .................. 10-2016-0015200
May 17, 2016 (KR) .................. 10-2016-0060385

(51) Int. Cl.
| H02J 7/00 | (2006.01) |
| H01F 5/04 | (2006.01) |
| H02J 50/12 | (2016.01) |
| H02J 50/70 | (2016.01) |
| H01F 27/28 | (2006.01) |
| H01F 38/14 | (2006.01) |

(52) U.S. Cl.
CPC ............ *H01F 5/04* (2013.01); *H01F 27/2804* (2013.01); *H01F 38/14* (2013.01); *H02J 50/12* (2016.02); *H02J 50/70* (2016.02)

(58) Field of Classification Search
CPC ....... H02J 5/00; H02J 5/003; H02J 5/04; H02J 50/10; H02J 50/80; H02J 7/025
USPC ......................................................... 320/108
See application file for complete search history.

(56) References Cited

U.S. PATENT DOCUMENTS

| 2017/0310149 A1* | 10/2017 | Koyanagi | ............... H02J 7/025 |
| 2018/0159358 A1* | 6/2018 | Yamaguchi | ............. H01Q 7/06 |

FOREIGN PATENT DOCUMENTS

| JP | 2004-206479 A | 7/2004 |
| KR | 10-2015-0072138 A | 6/2015 |
| KR | 10-2015-0099478 A | 8/2015 |

\* cited by examiner

*Primary Examiner* — Paul Dinh
(74) *Attorney, Agent, or Firm* — NSIP Law

(57) ABSTRACT

A coil module includes a substrate; a wireless charging coil formed in a substantially central portion of the substrate positioned on both surfaces of the substrate; and a first wireless communications coil which does not directly contact the wireless charging coil and is formed in the substantially central portion of the substrate on both surfaces of the substrate, wherein, in a region of the substrate in which the wireless charging coil and the first wireless communications coil are overlapped with each other, the wireless charging coil is formed on one surface of the region and the first wireless communications coil is formed on the other surface of the region, respectively.

16 Claims, 20 Drawing Sheets

COIL MODULE AND WIRELESS POWER RECEIVER USING THE SAME

CROSS-REFERENCE TO RELATED APPLICATION(S)

This application claims the benefit under 35 USC 119(a) of Korean Patent Application No. 10-2016-0015200 filed on Feb. 5, 2016 and 10-2016-0060385 filed on May 17, 2016 in the Korean Intellectual Property Office, the entire disclosures of which are incorporated herein by reference for all purposes.

BACKGROUND

1. Field

The present disclosure relates to a coil module and a wireless power receiver using the same.

2. Description of Related Art

In accordance with the trend for multifunctionality in mobile terminals, various coils have been used in mobile terminals.

For example, wireless charging coils for wireless charging, or coils for wireless communications have been used in mobile terminals. As coils for wireless communications, various types of coils such as an RFID tag coil, a near field communications (NFC) coil, a communications coil interlocked with a magnetic card reader, and the like may be used.

Therefore, in the case that it is beneficial for various kinds of coils to be mounted in one mobile terminal, the mobile terminal is required to be down-sized to maintain a portable and convenient size. Accordingly, a coil module having increased spatial efficiency of various kinds of coils and a wireless power receiver using the same are required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a coil module includes a substrate; a wireless charging coil formed in a substantially central portion of the substrate positioned on both surfaces of the substrate; and a first wireless communications coil which does not directly contact the wireless charging coil and is formed in the substantially central portion of the substrate on both surfaces of the substrate, wherein, in a region of the substrate in which the wireless charging coil and the first wireless communications coil are overlapped with each other, the wireless charging coil is formed on one surface of the region and the first wireless communications coil is formed on the other surface of the region, respectively.

The wireless charging coil may include a plurality of first coil patterns, disconnected from each other, formed on one surface of the substrate; a second coil pattern formed on the other surface of the substrate; and a plurality of vias connecting the plurality of first coil patterns and the second coil pattern to each other.

The first wireless communications coil may include first coil patterns, connected to each other, formed on one surface of the substrate.

The coil module may further include a second wireless communications coil including a first coil part formed to be wound multiple times on one side of the central portion, and a second coil part formed to be wound multiple times on the other side of the central portion.

The second wireless communications coil may form a first magnetic field, and at least a portion of a plurality of magnetic lines of force representing the first magnetic field have a closed loop shape that passes through the center of the first coil part and the center of the second coil part.

The wireless charging coil may be formed to be wound to have a substantially circular shape, the first coil part may be wound to have an asymmetrical shape, and a portion of the first coil part may have a shape corresponding to a portion of the substantially circular shape.

In a first region of the substrate in which the wireless charging coil and the second wireless communications coil are overlapped with each other, the wireless charging coil may be formed on one surface of the first region and the second wireless communications coil may be formed on the other surface of the first region, respectively.

The substrate may include a terminal part formed to protrude on one side thereof, and both terminals of the wireless charging coil and both terminals of the first wireless communications coils are formed on one surface of the terminal part.

According to another general aspect, a wireless power receiver wirelessly receives power or communications data through a resonator including a coil module, wherein the coil module includes a substrate; a wireless charging coil formed in a substantially central portion of the substrate through both surfaces of the substrate; and a first wireless communications coil which does not directly contact the wireless charging coil and is formed in the substantially central portion of the substrate through both surfaces of the substrate, wherein, in a region of the substrate in which the wireless charging coil and the first wireless communications coil are overlapped with each other, the wireless charging coil is formed on one surface of the region and the first wireless communications coil is formed on the other surface of the region, respectively.

The wireless charging coil may include a plurality of first coil patterns, disconnected from each other, formed on one surface of the substrate; a second coil pattern formed on the other surface of the substrate; and a plurality of vias connecting the plurality of first coil patterns and the second coil pattern to each other.

The first wireless communications coil may include first coil patterns, connected to each other, formed on one surface of the substrate.

The coil module may further include a second wireless communications coil including a first coil part formed to be wound multiple times on one side of the central portion, and a second coil part formed to be wound multiple times on the other side of the central portion.

The second wireless communications coil may form a first magnetic field, and at least a portion of a plurality of magnetic lines of force representing the first magnetic field may have a closed loop shape that passes through the center of the first coil part and the center of the second coil part.

The wireless charging coil may be formed to be wound to have a substantially circular shape, the first coil part may be wound to have an asymmetrical shape, and a portion of the first coil may have a shape substantially corresponding to a portion of the circular shape.

In a first region of the substrate in which the wireless charging coil and the second wireless communications coil are overlapped with each other, the wireless charging coil may be formed on one surface of the first region and the second wireless communications coil may be formed on the other surface of the first region, respectively. The substrate may include a terminal part formed to protrude on one side thereof, and both terminals of the wireless charging coil and both terminals of the first wireless communications coils may be formed on one surface of the terminal part.

According to another general aspect, a compound coil module includes a substrate; a first conductive coil for wireless power positioned around a substantially central region of the substrate, including disconnected conductive portions positioned on a first surface of the substrate; a shared coil portion positioned on a second surface of the substrate; and, conductive vias interconnecting each of the disconnected conductive portions with the shared coil portion; a second conductive coil for wireless communication, positioned around the same substantially central region of the substrate and passing between disconnected conductive portions of the first conductive coil; and, a compound conductive coil for wireless communication positioned around the same substantially central region of the substrate and comprising a first coil portion and a second coil portion spaced from the first coil portion, wherein the first coil portion and the second coil portion are configured to collectively generate a magnetic field in mutually reinforced manner passing over both the first and second conductive coils and substantially spanning a length of the substrate.

The first conductive coil may have a substantially circular shape; at least a portion of the second conductive coil may be configured to have a contour substantially the same as the first conductive coil; and, at least a portion of the compound conductive coil is configured to have a contour substantially the same as the first conductive coil.

The first conductive coil, the second conductive coil, and the compound conductive coil may be arranged in substantially concentric manner.

The compound coil may further include a shared terminal portion with terminals for each of the first conductive coil, the second conductive coil, and the compound conductive coil positioned on a surface of the shared terminal portion.

According to another general aspect, a compound coil module includes a substrate having first and second opposing surfaces; a first conductive coil configured for wireless power transfer positioned around a substantially central region of the substrate, wherein portions of the first conductive coil are laterally discontinuous on the first surface of the substrate and are coupled through conductive vias passing through the substrate to shared portions of the first conductive coil on the second surface of the substrate, the laterally discontinuous portions defining spaces therebetween on the first surface of the substrate; a second conductive coil configured for wireless communication positioned around the substantially central region of the substrate, wherein portions of the second conductive coil pass through the spaces defined between the laterally discontinuous portions of the first conductive coil.

Other features and aspects will be apparent from the following detailed description, the drawings, and the claims.

BRIEF DESCRIPTION OF DRAWINGS

The above and other aspects, features and other advantages will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments will now be described in detail with reference to the accompanying drawings.

Figure 1:
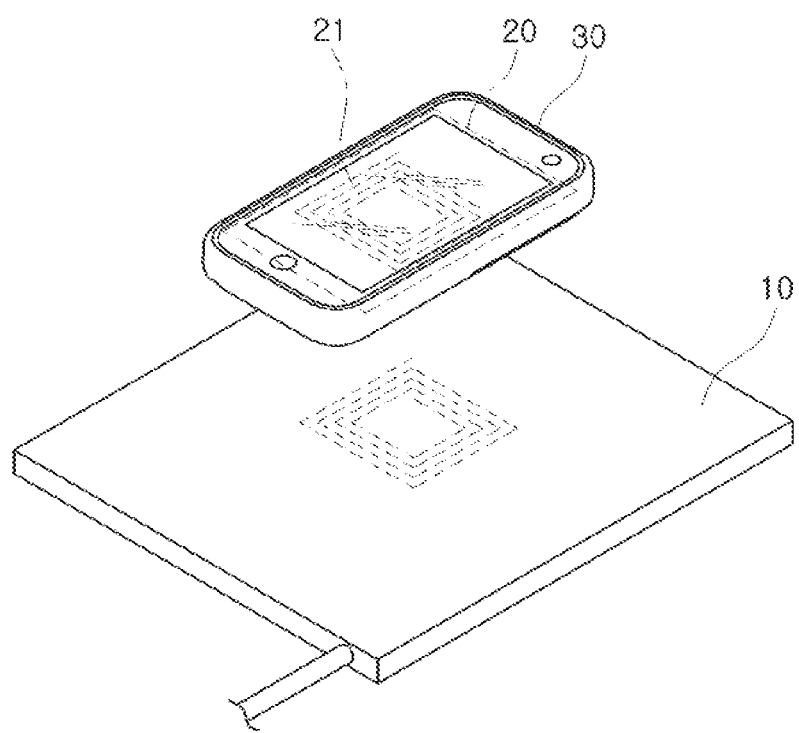
FIG. 1 is a diagram illustrating an application of a wireless power receiver according to an embodiment.

FIG. 1 is a diagram illustrating an application example of a wireless power receiver according to an embodiment.

The wireless power receiver illustrated in FIG. 1 includes a coil module, and the coil module includes a plurality of wireless communications coils in addition to a wireless charging coil. In the illustrated example, the wireless power receiver 20 is magnetically coupled to the wireless power transmitter 10 through the wireless charging coil 21 to wirelessly receive power.

The wireless power receiver 20 is coupled to a mobile terminal 30, such as a module external or internal, or is one component of the mobile terminal 30 built in integrated manner. The wireless power receiver 20 provides the wirelessly received power to the mobile terminal 30.

Because the wireless power receiver 20 also includes the wireless communications coil, a function of wireless communications, in addition to a function of wireless charging, is performed thereby, as illustrated in FIG. 1.

Figure 2:
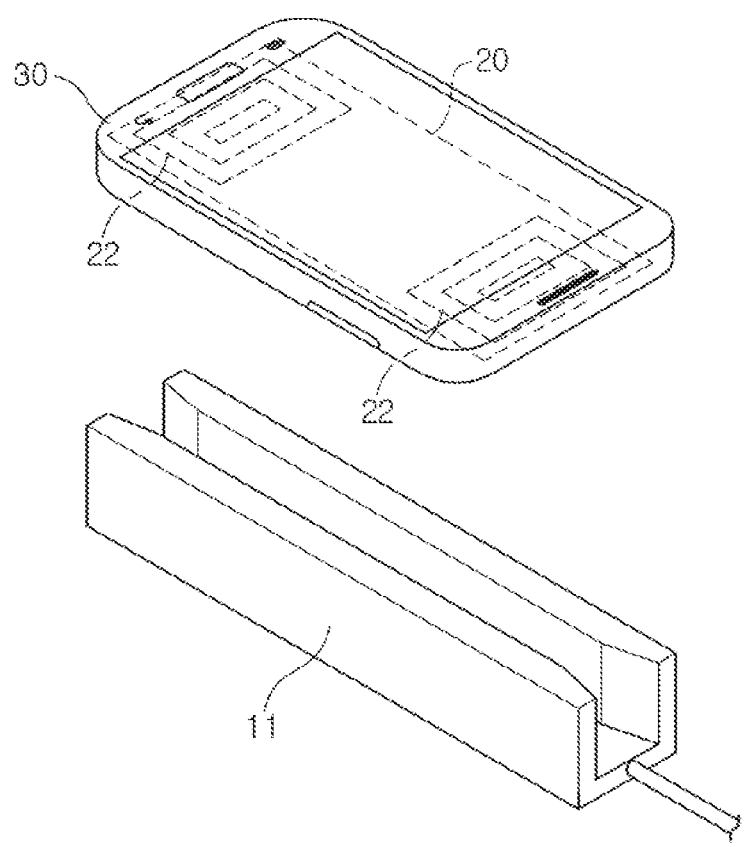
FIG. 2 is a diagram illustrating another application of a wireless power receiver according to an embodiment.

FIG. 2 is a diagram illustrating another application of a wireless power receiver according to an embodiment.

In the example illustrated in FIG. 2, the wireless power receiver 20 is magnetically coupled to a magnetic card reader 11 to thereby transmit predetermined data (e.g., card information, authorization codes, amounts, biometric information, or other relevant transactional or identification information) to the magnetic card reader 11.

That is, in the example illustrated in FIG. 2, the wireless power receiver 20 is magnetically coupled to a magnetic read head of the magnetic card reader 11 through the compound wireless communications coil 22 (which, as seen here, includes a spaced constellation of two or more coil portions arranged to form a composite or compound coil 22) included in the wireless power receiver 20 to thereby transmit data such as the card information. Because the header of the magnetic card reader 11 identifies the card information from a change of polarity of a magnetic strip, the wireless power receiver 20 empowers the magnetic card reader 11 to receive the card information (such as by reading the magnetic strip), by providing a change of polarity of the wireless communications coil 22.

The wireless power receiver 20, according to one or more embodiments, further includes one or more other wireless communications coils for various technologies (e.g., NFC) such as for near field communications.

As such, the wireless power receiver 20 wirelessly transmits or receives the data in addition to wirelessly receiving the power. To this end, the wireless power receiver 20 includes, according to one or more embodiments, a plurality of coils.

Hereinafter, one configuration example of the wireless power receiver 20 is described with reference to FIG. 3.

Figure 3:
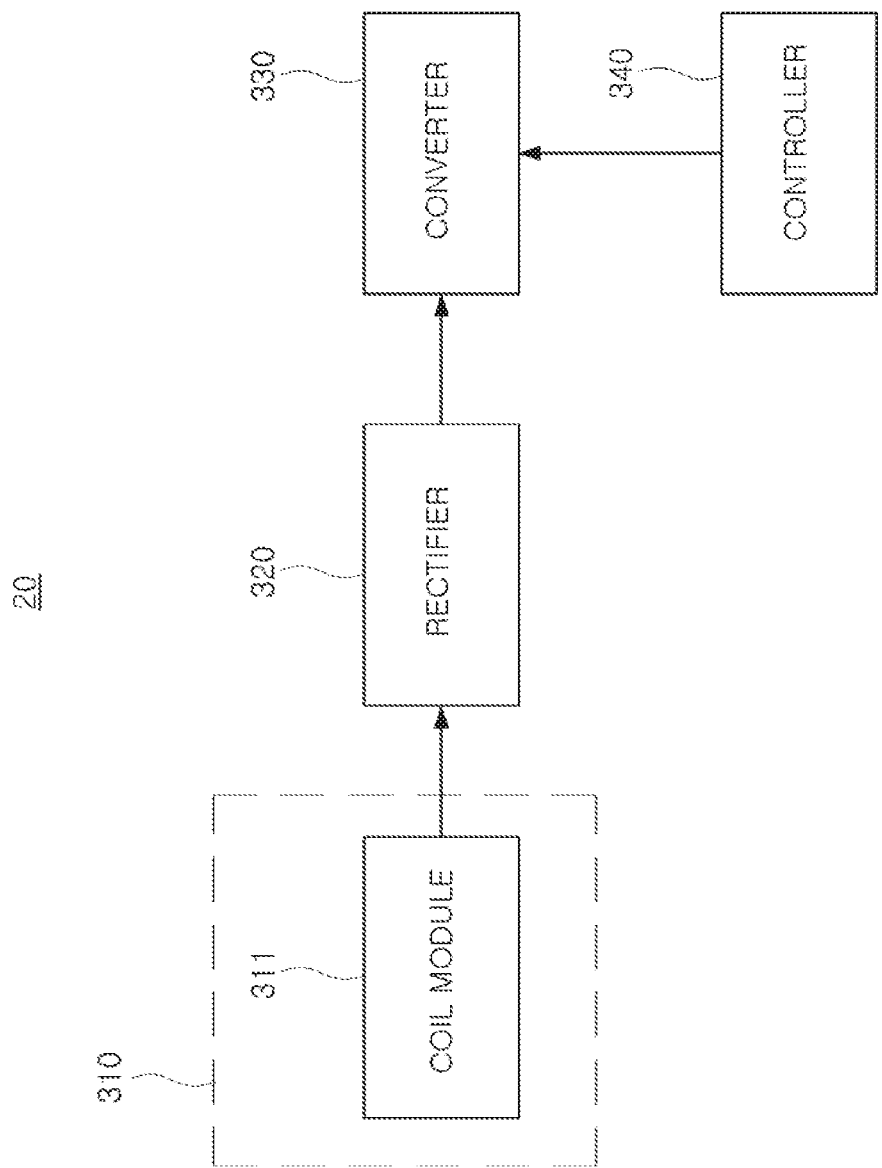
FIG. 3 is a block diagram illustrating a wireless power receiver according to an embodiment.

FIG. 3 is a block diagram illustrating the wireless power receiver according to an embodiment.

Referring to FIG. 3, the wireless power receiver 20 includes a resonator 310, a rectifier 320, a converter 330, and a controller 340.

The resonator 310 includes a coil module 311. The coil module 311, according to one or more embodiments, includes a substrate including a plurality of coils. Various examples of the coil module 311 are described below with reference to FIGS. 2 through 19.

The rectifier 320 rectifies alternating current (AC) power which is wirelessly received through the resonator 310. According to an embodiment, the rectifier 320 further includes a smoothing element such as a capacitor or other suitable circuit.

An output of the rectifier 320 is provided to the converter 330, and is converted into a direct current (DC) voltage of a desired level at the mobile terminal by the converter 330. The controller 340 controls an operation of the converter 330 to control an output of the converter 330.

The components described above describe an example of a case in which the wireless power receiver 20 is operated in a mode wirelessly receiving the power.

Meanwhile, in a case in which the wireless power receiver 20 is operated for wireless communications, the wireless power receiver 20 provides a signal received through the resonator 310 to the mobile terminal.

Figure 4:
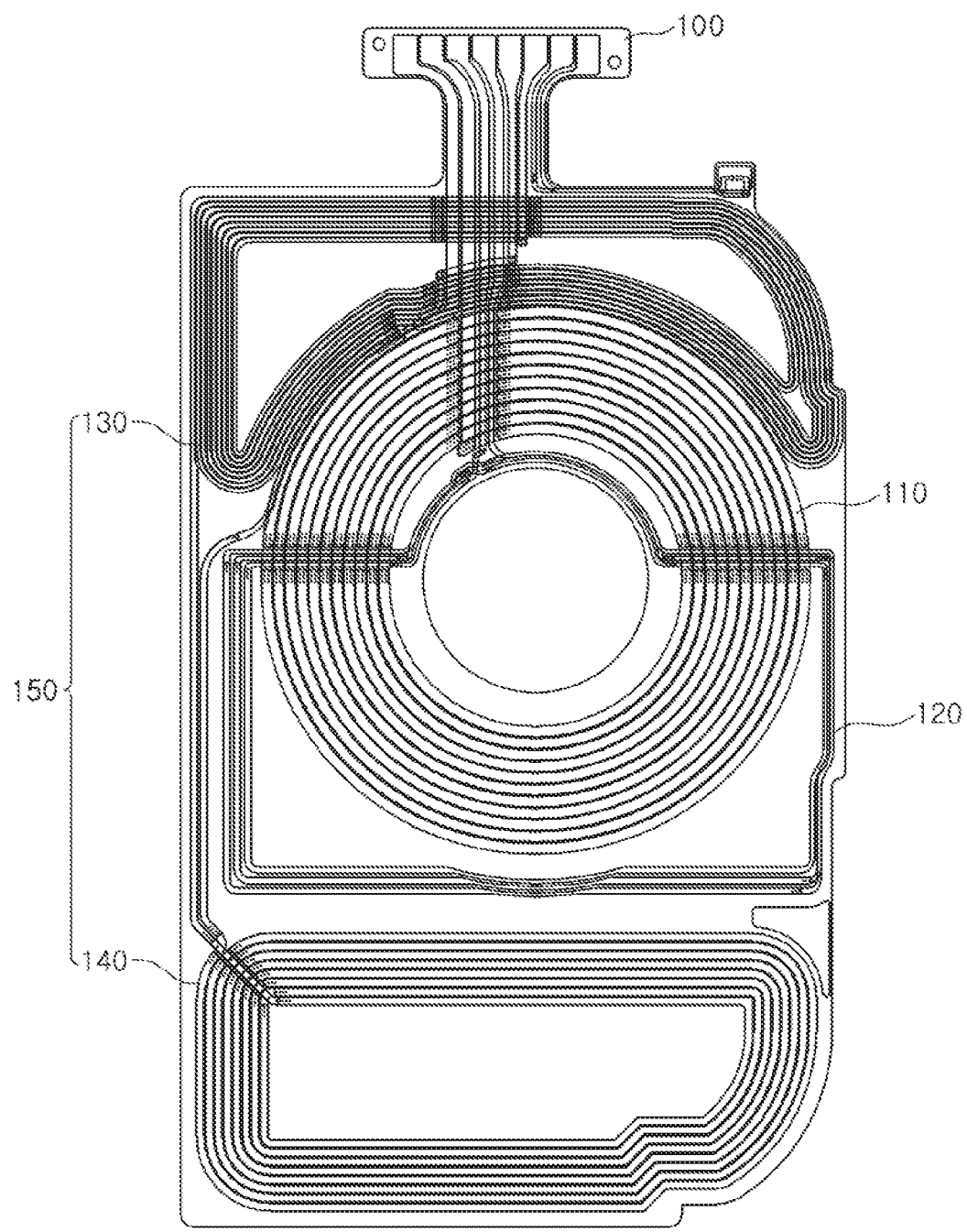
FIG. 4 is a diagram illustrating a coil module according to an embodiment.

FIG. 4 is a diagram illustrating a coil module according to an embodiment.

In order to describe a structure of a coil in FIG. 4, the coil was schematized without classifying one surface and the other surface of the substrate 100. That is, FIG. 4 illustrates a winding state of each of the coils on the assumption that the substrate 100 is in a transparent state for clarity.

Referring to FIG. 4, the coil module includes the substrate 100, and a plurality of coils 110, 120, and 150 formed thereon.

The coil module includes a wireless charging coil 110, a first wireless communications coil 120, and a second wireless communications coil 150.

The wireless charging coil 110 is formed in a substantially central portion of the substrate 100.

The wireless charging coil 110 is formed to have a substantially circular shape to have a wider winding area.

One component of the mobile terminal to which the coil module is applied exists in a circular internal space of the wireless charging coil 110. In the illustrated example, the wireless charging coil 110 secures the circular internal space and is wound to have a substantially circular shape, but this is only illustrative. Therefore, the wireless charging coil 110 is wound in various shapes, according to embodiments.

The first wireless communications coil 120 is formed in the substantially central portion. The first wireless communications coil 120 does not directly contact the wireless charging coil 110 and the second wireless communications coil 150.

For example, in a first region of the substrate on which the substrate 100, the wireless charging coil 110, and the first wireless communications coil 120 are overlapped with each other, the wireless charging coil 110 is formed on one surface of the first region, and the first wireless communications coil 120 is formed on the other surface of the first region.

In addition, in a second region of the substrate on which the substrate 100, the second wireless communications coil 150, and the first wireless communications coil 120 are overlapped with each other, the second wireless communications coil 150 is formed on one surface of the second region, and the first wireless communications coil 120 is formed on the other surface of the second region.

The second wireless communications coil 150 is formed on one side and the other side of the central portion.

The second wireless communications coil 150 includes a first coil part 130 formed to be wound multiple times on one side of the central portion, and a second coil part 140 formed to be wound multiple times on the other side of the central portion. The first coil part 130 and the second coil part 140 are connected to each other in series while having a pair of terminals at both ends thereof.

The second wireless communications coil 150 forms a wide magnetic field using the first coil part 130 and the second coil part 140. A description thereof is provided below with reference to FIG. 20.

The second wireless communications coil 150 does not directly contact the wireless charging coil 110. For example, the second wireless communications coil 150 and the wireless charging coil 110 are partially overlapped with each other, but are formed on different surfaces of the substrate 100, respectively, so as not to directly contact each other.

That is, in a region of the substrate on which the substrate, the wireless charging coil 110, and the second wireless communications coil 150 are overlapped with each other, the wireless charging coil 110 is formed on one surface of the region, and the second wireless communications coil 150 is formed on the other surface of the region.

Figure 5:
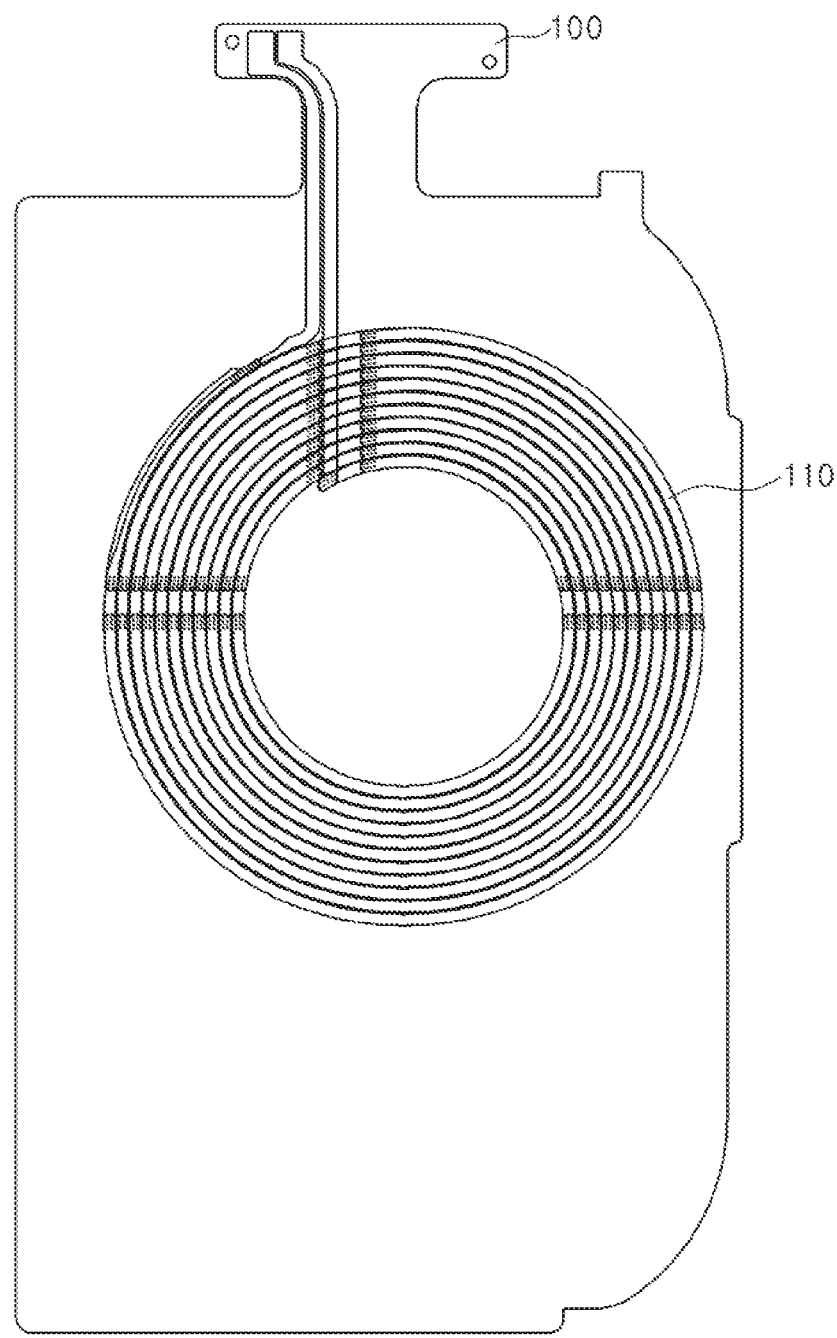
FIG. 5 is a diagram illustrating a wireless charging coil, such as the one illustrated in FIG. 4.

FIG. 5 is a diagram illustrating a wireless charging coil, such as the one illustrated in FIG. 4.

In order to more clearly describe a structure of a coil in FIG. 5, the wireless charging coil 110 is illustrated without classifying one surface and the other surface of the substrate 100.

Because the wireless charging coil 110 is provided to wirelessly transmit power, a wider area or the larger number of windings than other coils is found to be beneficial. Therefore, the wireless charging coil 110 is formed at the central region of the substrate 100 to more optimally provide this wider area for improved charging and flux capture.

As an example, the wireless charging coil 110, according to one or more embodiments, has about 8 to about 13 windings.

Because various wireless charging standards are applied to the wireless charging coil 110, the wireless charging coil 110 is not limited to supporting a specific wireless charging standard in the present specification. For example, the wireless charging coil 110 supports any one or any combination of two or more of: alliance for wireless power (A4WP), power matters alliance (PMA), and/or wireless power consortium (WPC). In other words, the wireless charging coil 110, according to one or more embodiments, may simultaneously support at least two standards of the above-mentioned standards.

Figure 6:
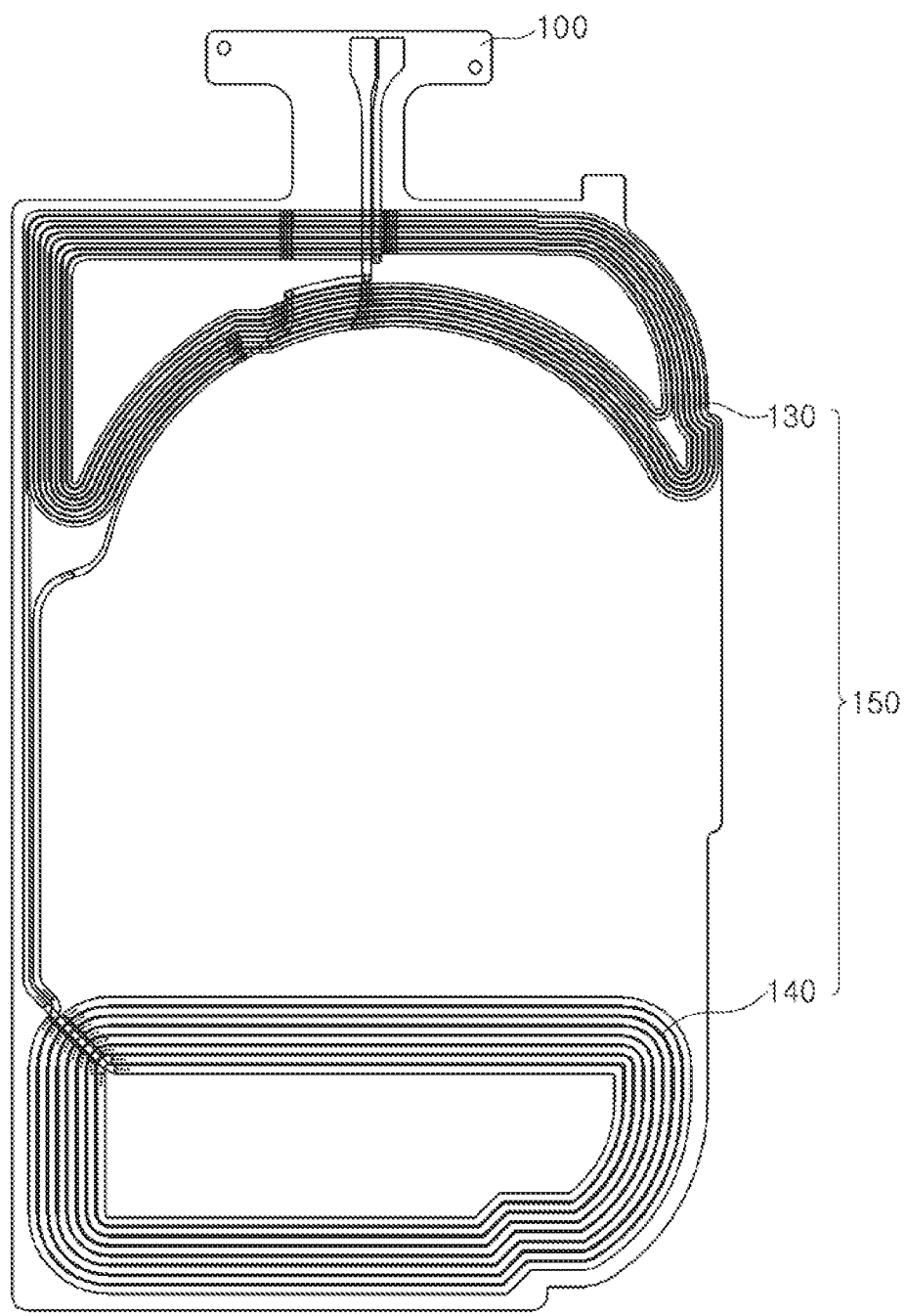
FIG. 6 is a diagram illustrating a second wireless communications coil, such as the one illustrated in FIG. 4.

FIG. 6 is a diagram illustrating a second wireless communications coil, such as the one illustrated in FIG. 4.

In order to describe a structure of a coil in FIG. 6, the second wireless communications coil 150 is also illustrated, for clarity, without classifying one surface and the other surface of the substrate 100.

The second wireless communications coil 150 includes two coils in compound manner, selectively positioned and spaced apart from each other, that is, the first coil part 130 and the second coil part 140. The second wireless communications coil 150 forms a magnetic field having a widely spread shape covering a greater area than both of the two coil parts using the two coil parts, spaced apart from each other.

In order to have a sufficient spacing distance between the first coil part 130 and the second coil part 140, the first coil part 130 is formed on one side of the central portion, and the second coil part 140 is formed on the other side of the central portion, according to an embodiment. Therefore, in the illustrated example, the magnetic field covering an overall region of the substrate is formed by the first coil part 130 and the second coil part 140.

The first coil part 130 has, for example, an asymmetrical shape. The second coil part 140 also has the asymmetrical shape.

That is, because the first coil part 130 or the second coil part 140 are formed on one side or the other side of the central portion, respectively, the first coil part 130 or the second coil part 140 are formed to correspond to an exterior of the substrate in some regions, and are formed to correspond to shapes of other coils in remaining regions in order to secure an appropriate spacing distance from other coils while optimizing a surface area use of the substrate.

For example, some of the first coil part 130 has a shape encompassing the circular shape of the wireless charging coil positioned in the central portion, and others of the first coil part 130 are formed to correspond to an outer shape of the substrate 100. Some of the second coil part 140 have a shape encompassing either one or both of the first wireless communications coil and the wireless charging coil and positioned in the central portion, and others of the second coil part 140 are formed to correspond to the outer shape of the substrate 100. Therefore, the first coil part 130 or the second coil part 140 of the second wireless communications coil are formed in an asymmetrical shape as illustrated.

Figure 7:
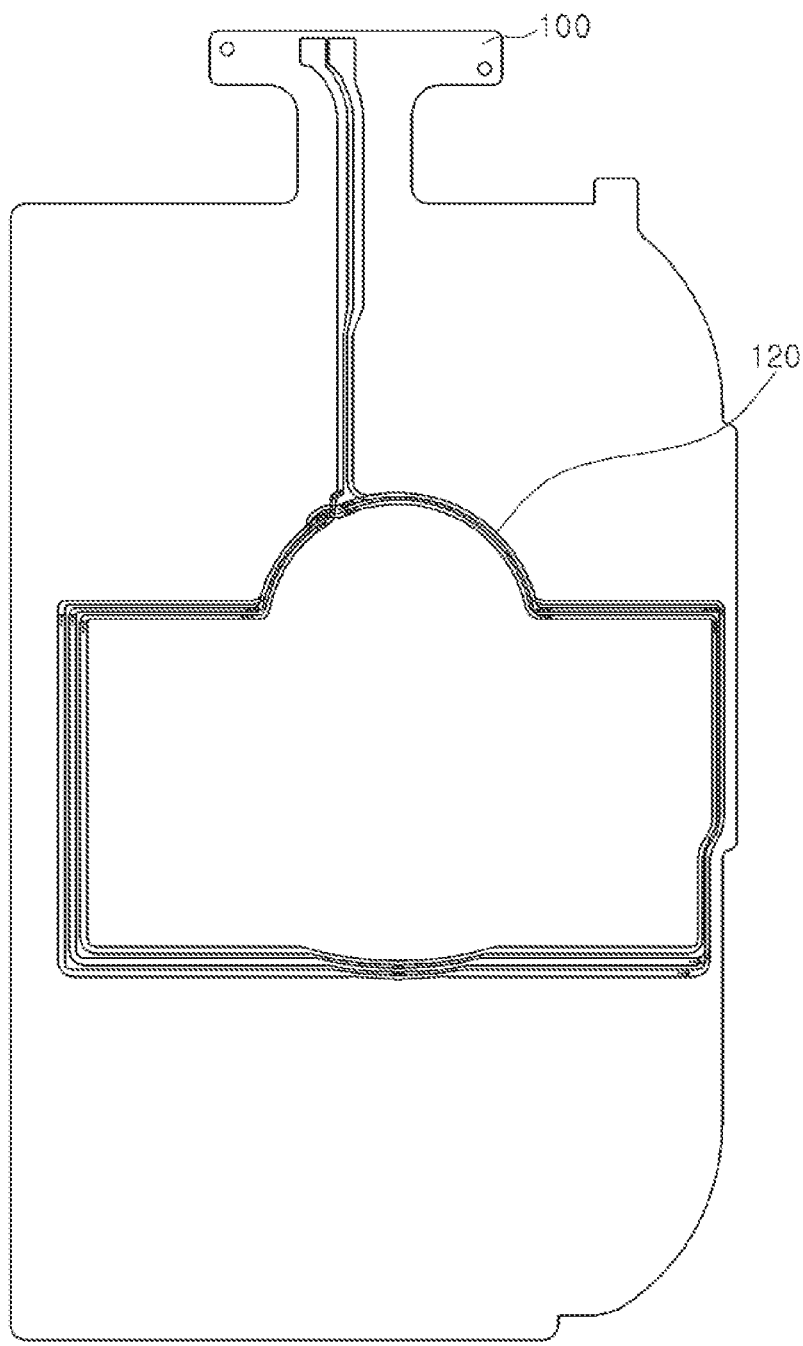
FIG. 7 is a diagram illustrating a second wireless communications coil, such as the one illustrated in FIG. 4.

FIG. 7 is a diagram illustrating a first wireless communications coil, such as the one illustrated in FIG. 4.

In order to describe a structure of a coil in FIG. 7, the coil was also schematized without classifying one surface and the other surface of the substrate 100—but is the result of a logical OR operation which shows a concatenation of both coil portions on the two surfaces, respectively.

Because the first wireless communications coil 120 is for wireless communications, an object transmitted or received by the first wireless communications coil 120 is a signal such as data representing a transaction, a wireless power coupling parameter, a battery characteristic, or other real-world information beneficial for the operation of a device housing substrate 200. Therefore, as illustrated, the first wireless communications coil 120, according to one or more embodiments, has a small number of windings (for example, about 2 to about 5).

Various wireless communications standards are applied to the first wireless communications coil 120. However, the first wireless communications coil 120 may, according to one or more embodiments, support a different wireless communications standard from the second wireless communications coil 150. For example, the first wireless communications coil 120 supports near field communications (NFC), whereas the second wireless communications coil 150 may support Magnetic Secure Transmission (MST), Bluetooth, WiFi, or other suitable wireless communications.

Hereinafter, the coils formed on the respective surfaces of the substrate are described with reference to FIGS. 8 through 15.

Figure 8:
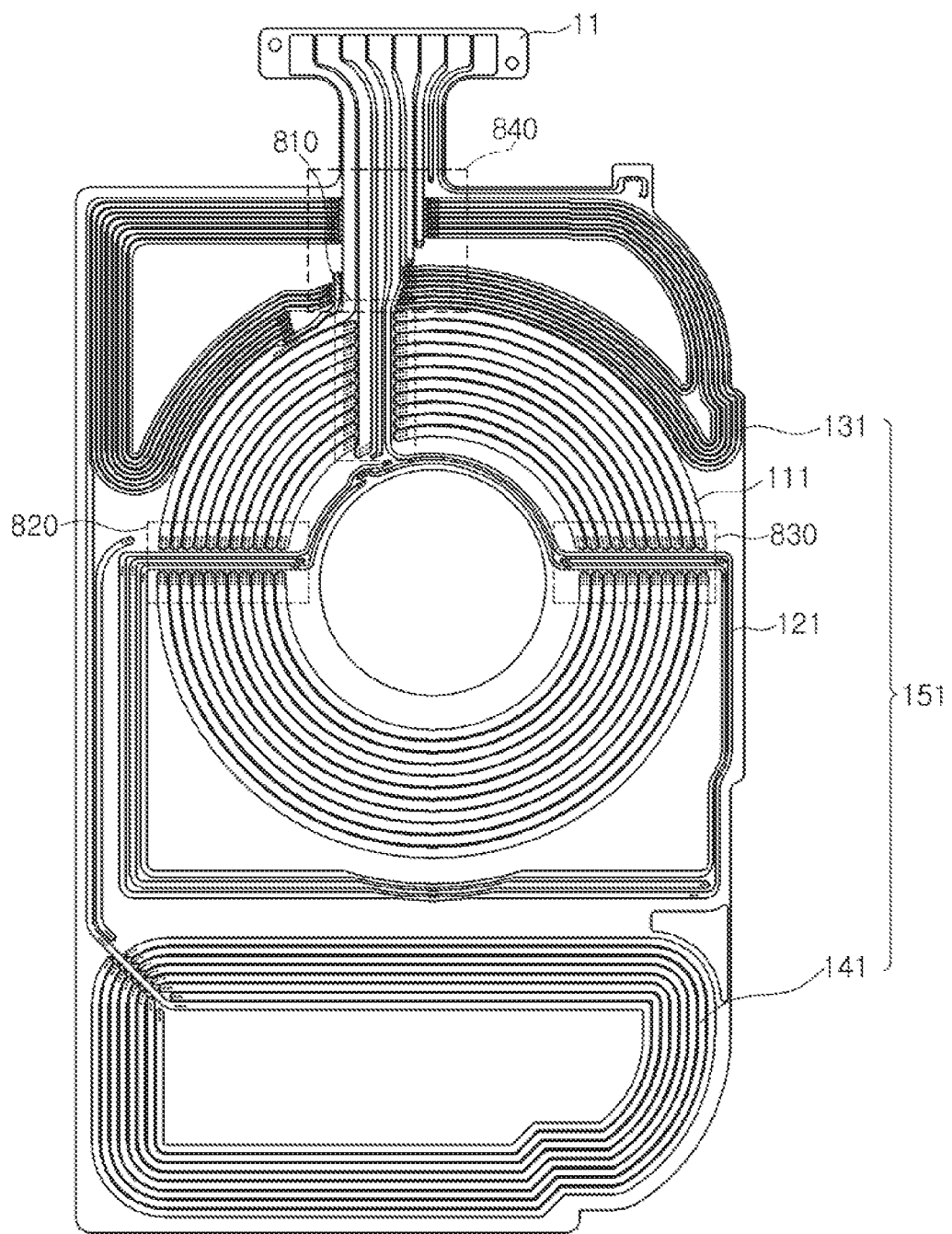
FIG. 8 is a plan view illustrating one surface of a coil module, such as the one illustrated in FIG. 1.
Figure 9:
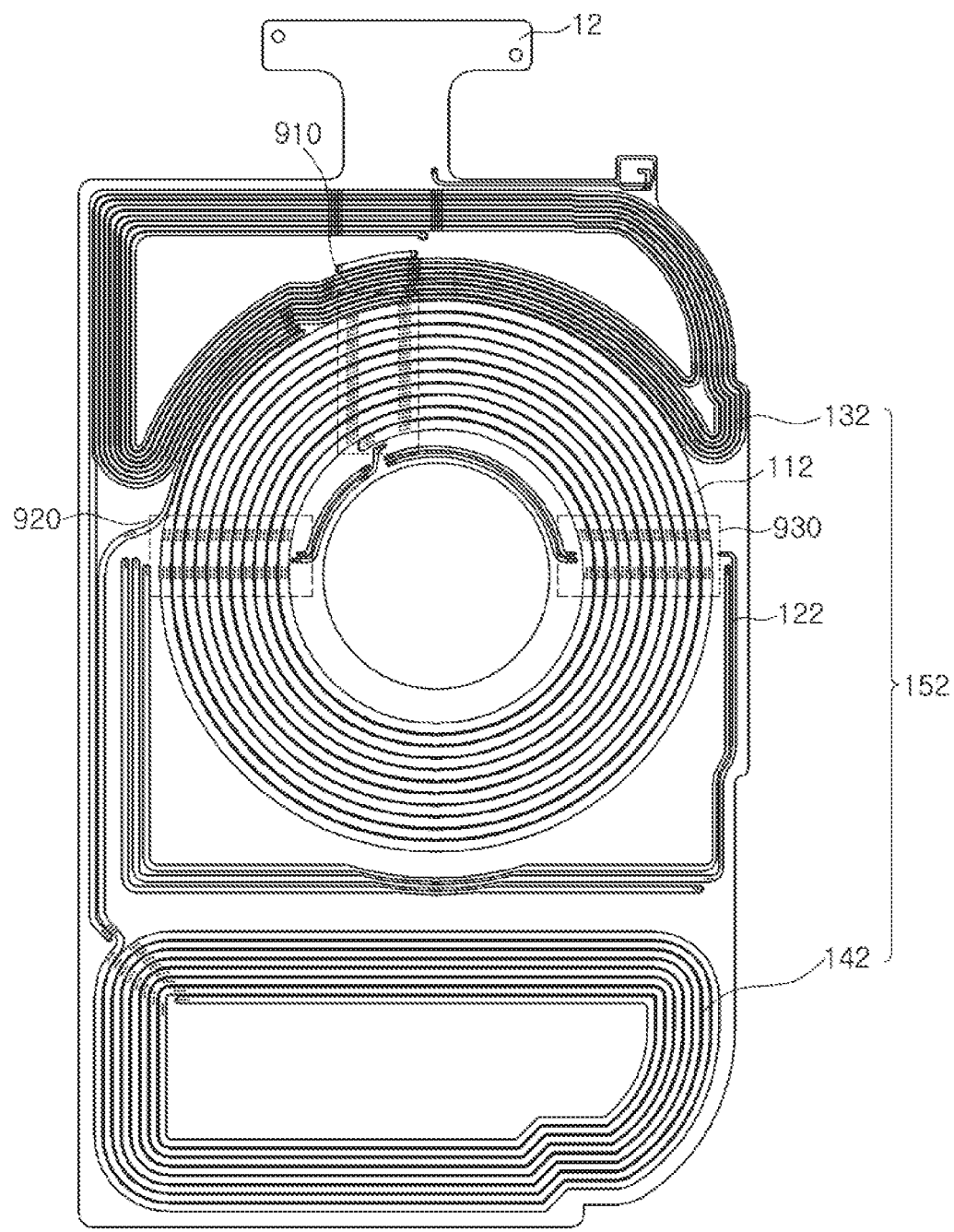
FIG. 9 is a bottom view illustrating another surface of a coil module, such as the one illustrated in FIG. 1.

FIG. 8 is a plan view illustrating one surface of the coil module illustrated in FIG. 1 and FIG. 9 is a bottom view illustrating the other surface of the coil module illustrated in FIG. 1.

First, referring to FIG. 8, the wireless charging coil 111 has an empty space on one surface 11 of the substrate in regions 810, 820, and 830. A portion of the first wireless communications coil 121 is formed in the corresponding empty space on one surface 11 of the substrate. The substrate includes a terminal part formed to protrude on one side thereof, and both terminals of the respective coils are formed on one surface of the terminal part, according to an embodiment. A first coil part 131 of the second wireless communications coil 151 is formed on one side which is adjacent to the terminal part. Therefore, the first coil part 131 is not formed in a space in which the terminal of each of the coils is formed. This allows each of the terminals and the first coil part 131 not to directly contact each other.

As such, a part of the coil on a portion of one surface 11 of the substrate has a plurality of patterns, disconnected from each other. However, the plurality of patterns are connected to each other through one or more vias and a coil (or portions thereof) formed on a rear surface of the substrate.

That is, referring to FIG. 9, the wireless charging coil 112 is formed in regions 910, 920, and 930 of the other surface 12 of the substrate corresponding to regions 810, 820, and 830 of one surface 11 of the substrate. Therefore, the wireless charging coil 111 on one surface 11 of the substrate is connected to the wireless charging coil 112 formed on the other surface 12 of the substrate through one or more via holes.

Meanwhile, on the other surface 12 of the substrate, a first wireless communications coil 122 is formed as a plurality of separated patterns. The patterns of the first wireless communications coil 122, separated from each other on the other surface 12 of the substrate are connected to each other through vias and the first wireless communications coil 121 formed on one surface 11 of the substrate. In other words, the patterns of the first wireless communication coil 121 and 122 share conductive coil portions where the first wireless communication coil 121 and 122 would otherwise interfere or directly contact portions of the wireless charging coil 111, for example, portions 810, 820, 830, 910, 920, and 930.

Similarly, as illustrated in FIG. 8, the second wireless communications coil 151 may also have an empty space on one surface 11 of the substrate in a region 840. A coil pattern for leading (such as lead-in and/or lead-out) the terminal of the wireless charging coil 111 or the first wireless communications coil 121 is formed in the corresponding empty space on one surface 11 of the substrate.

That is, the second wireless communications coil 151 does not directly contact the wireless charging coil 111, and in the region 840 of the substrate 11 in which the wireless charging coil 111 and the second wireless communications coil 151 are overlapped with each other, the wireless charging coil 111 is formed on one surface (e.g., a top surface as in the example illustrated in FIG. 8) of the region 840, and the second wireless communications coil 151 is formed on the other surface (e.g., a top surface as in the example illustrated in FIG. 9) of the region 840, respectively. The second wireless communications coil 151 may also be formed similarly to the wireless charging coil 111.

Hereinafter, the coils formed on the respective surfaces of the substrate are described with reference to FIGS. 10 through 15.

Figure 10:
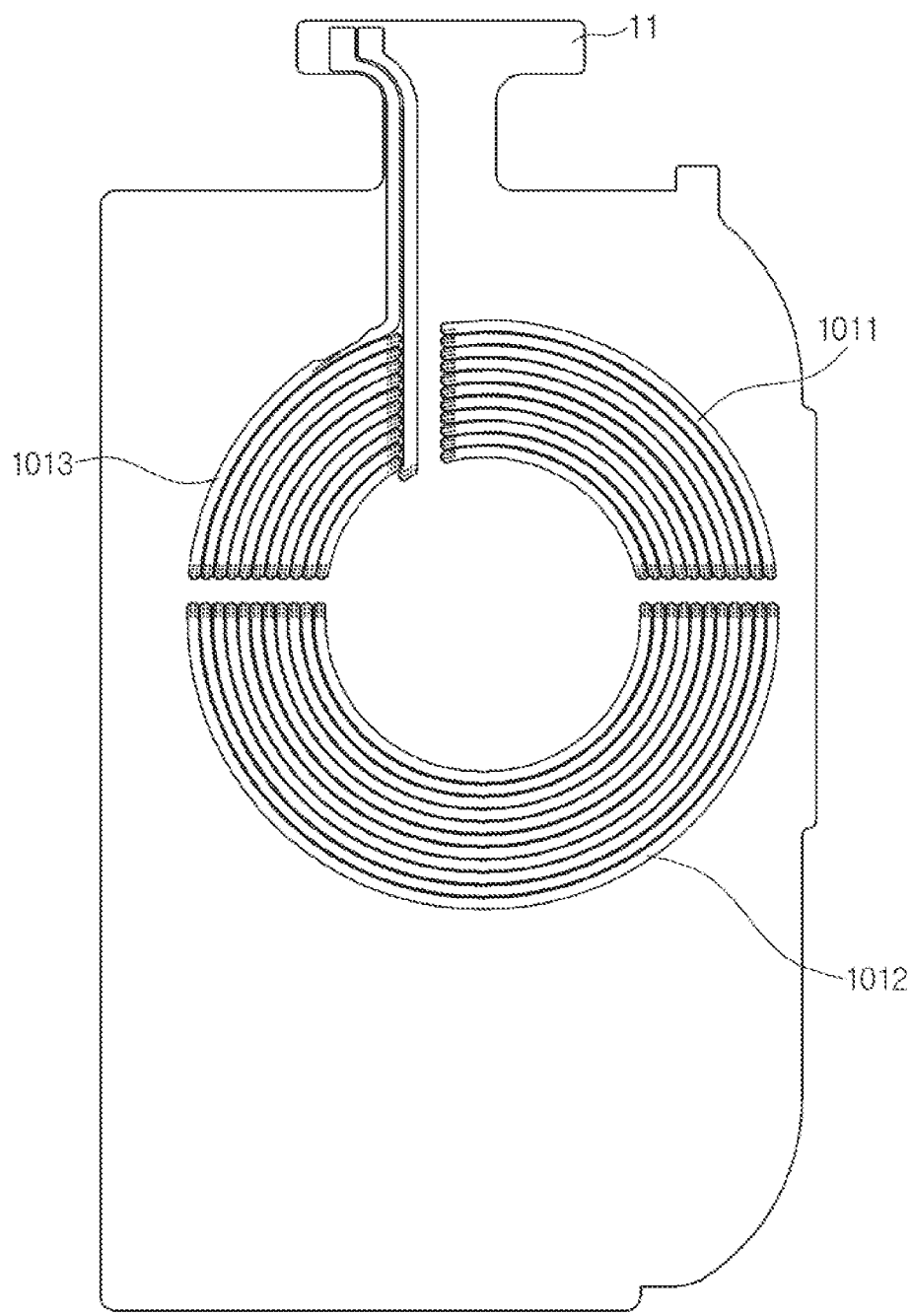
FIG. 10 is a plan view illustrating one surface of a wireless charging coil, such as the one illustrated in FIG. 8.
Figure 11:
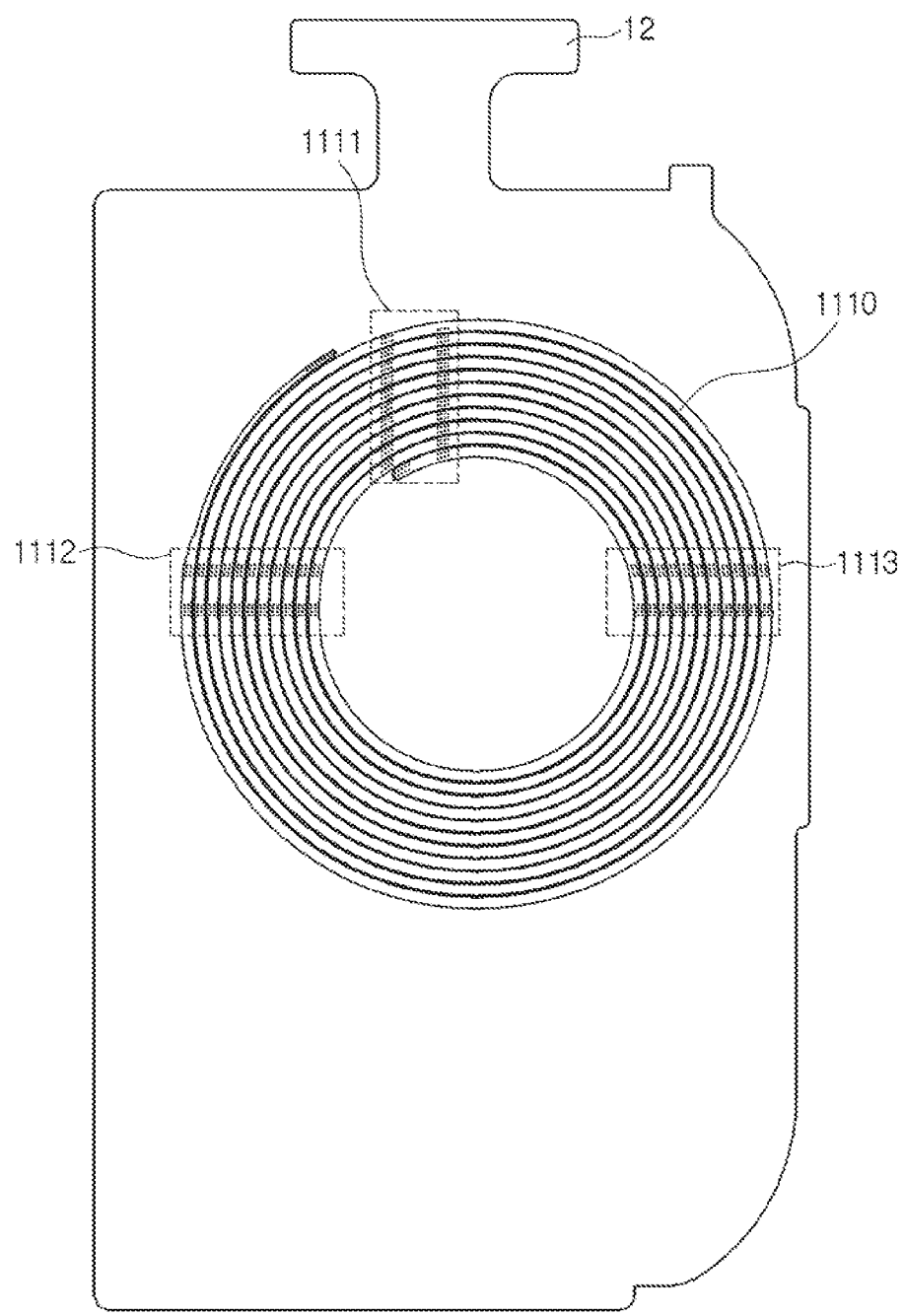
FIG. 11 is a bottom view illustrating another surface of a wireless charging coil, such as the one illustrated in FIG. 9.

FIG. 10 is a plan view illustrating one surface of a wireless charging coil, such as wireless charging coil 111, illustrated in FIG. 8; and FIG. 11 is a bottom view illustrating the other surface of a wireless charging coil, such as the one illustrated in FIG. 9.

First, referring to FIG. 10, the wireless charging coil includes a plurality of first coil patterns 1011, 1012, and 1013, separated from each other on one surface 11 of the substrate (and sharing conductive portions of coil on the other surface 12 of the substrate). The plurality of first coil patterns 1011, 1012, and 1013 are spaced apart from each other by a predetermined distance, and either one or both of the first wireless communications coil and the second wireless communications coil are formed in the spaced space (or spaces) as described above.

Because the wireless charging coil should be formed so that a current flows, the plurality of first coil patterns 1011, 1012, and 1013, (which appear disconnected from each other in FIG. 10) should be electrically connected to each other. To this end, as illustrated in FIG. 11, the plurality of first coil patterns 1011, 1012, and 1013, (appearing disconnected from each other in FIG. 10) are electrically connected to each other by via holes penetrating through one surface 11 and the other surface 12 of the substrate, and the second coil pattern 1110 formed on the other surface 12 of the substrate. As illustrated, the via holes are formed in positions substantially corresponding to ends of the disconnected coil patterns. However, the via holes may be formed at other locations.

In FIG. 11, the second coil pattern 1110 is formed on the other surface 12 of the substrate in a shape substantially corresponding to an overall shape of the wireless charging coil. However, according to an embodiment, the coil patterns may also be formed only in regions 1111, 1112, and 1113 so as to electrically connect only the plurality of first coil patterns 1011, 1012, and 1013, disconnected from each other.

As such, the wireless charging coil may form coils using both surfaces of the substrate. In addition, it is seen that the wireless charging coil includes the plurality of coil patterns 1011 to 1013 (shown in FIG. 10), disconnected from each other on one surface of the substrate, and the coil pattern 1110 (shown in FIG. 11) electrically connecting the plurality of disconnected coil patterns on the other surface of the substrate. This is to form the first wireless communications coil or the second wireless communications coil using disconnected regions of the disconnected coil patterns.

Figure 12:
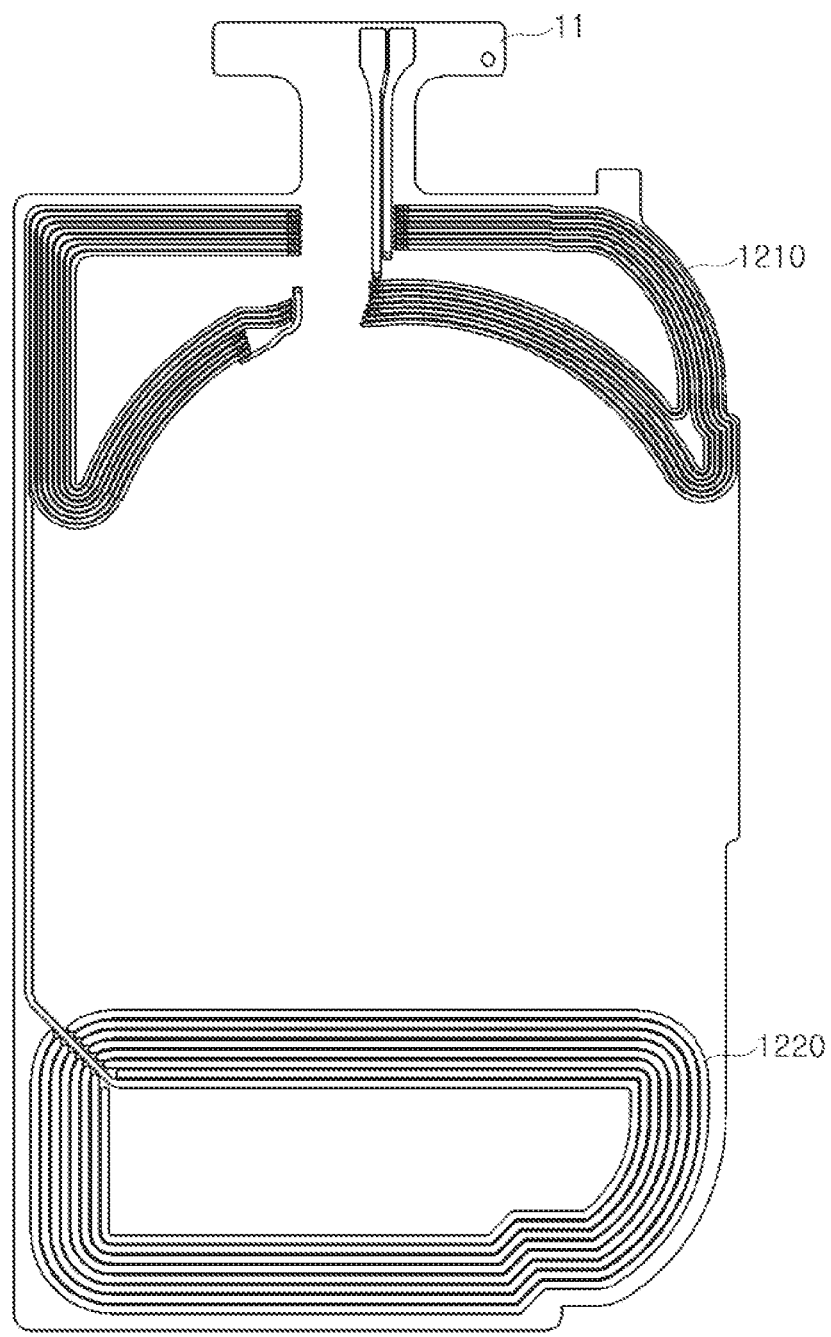
FIG. 12 is a plan view illustrating one surface of a second wireless communications coil, such as the one illustrated in FIG. 8.
Figure 13:
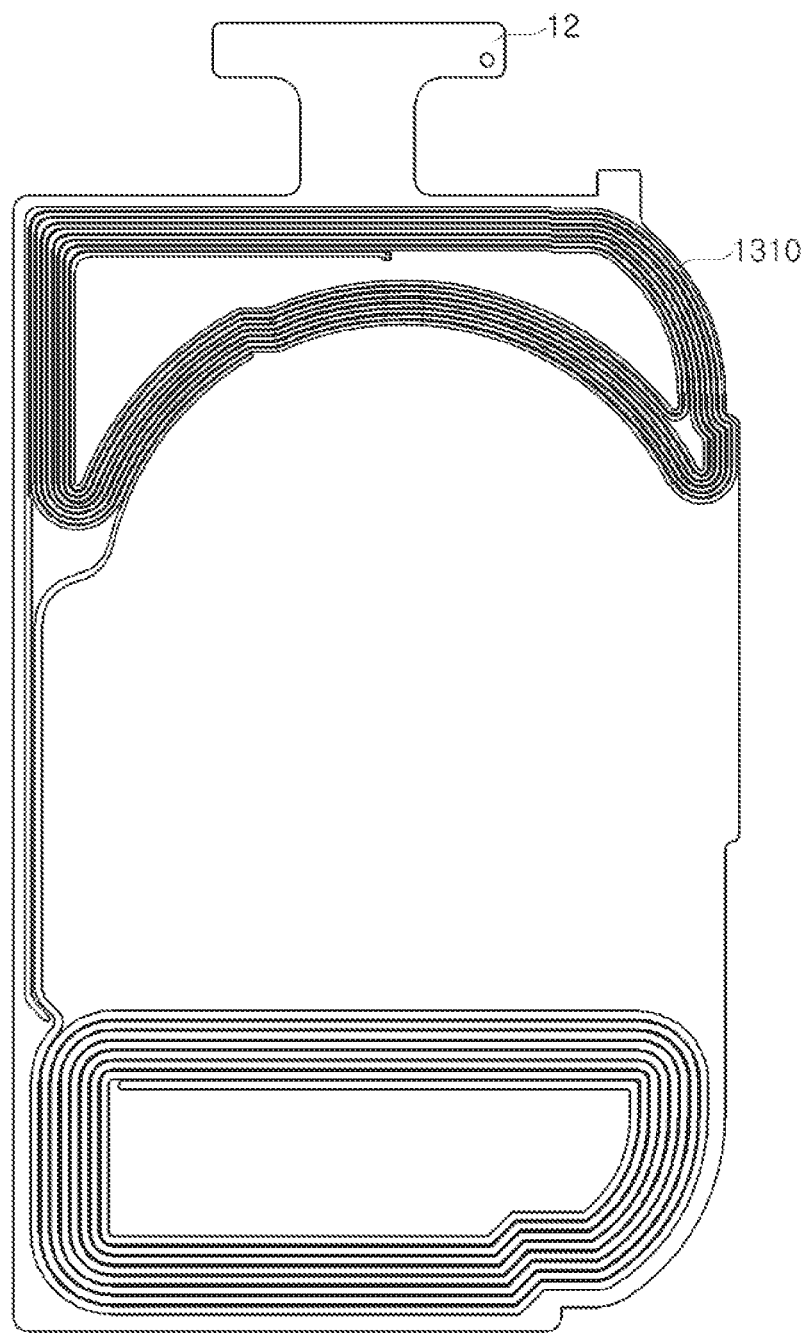
FIG. 13 is a bottom view illustrating another surface of a second wireless communications coil, such as the one illustrated in FIG. 9.

FIG. 12 is a plan view illustrating one surface of a second wireless communications coil illustrated in FIG. 8; and FIG. 13 is a bottom view illustrating the other surface of the second wireless communications coil illustrated in FIG. 9.

Referring to FIGS. 12 and 13, the second wireless communications coil includes a plurality of coil patterns 1210 and 1220, which may be disconnected from each other on one surface 11 of the substrate, and a coil pattern 1310 formed on the other surface 12 of the substrate.

Because terminals of other coils are led into the terminal part on one surface 11 of the substrate, the second wireless communications coil is formed in the plurality of coil patterns 1210 and 1220, disconnected from each other.

That is, the second wireless communications coil also forms coils using both surfaces of the substrate. The second wireless communications coil includes the plurality of coil patterns 1210 and 1220 (shown in FIG. 12), disconnected from each other on one surface of the substrate, and the coil pattern 1310 (shown in FIG. 13) electrically connecting the plurality of disconnected coil patterns on the other surface of the substrate. This is to form the wireless charging coil 111 or the first wireless communications coil 121 using spaces created by disconnected regions of the disconnected coil patterns.

Figure 14:
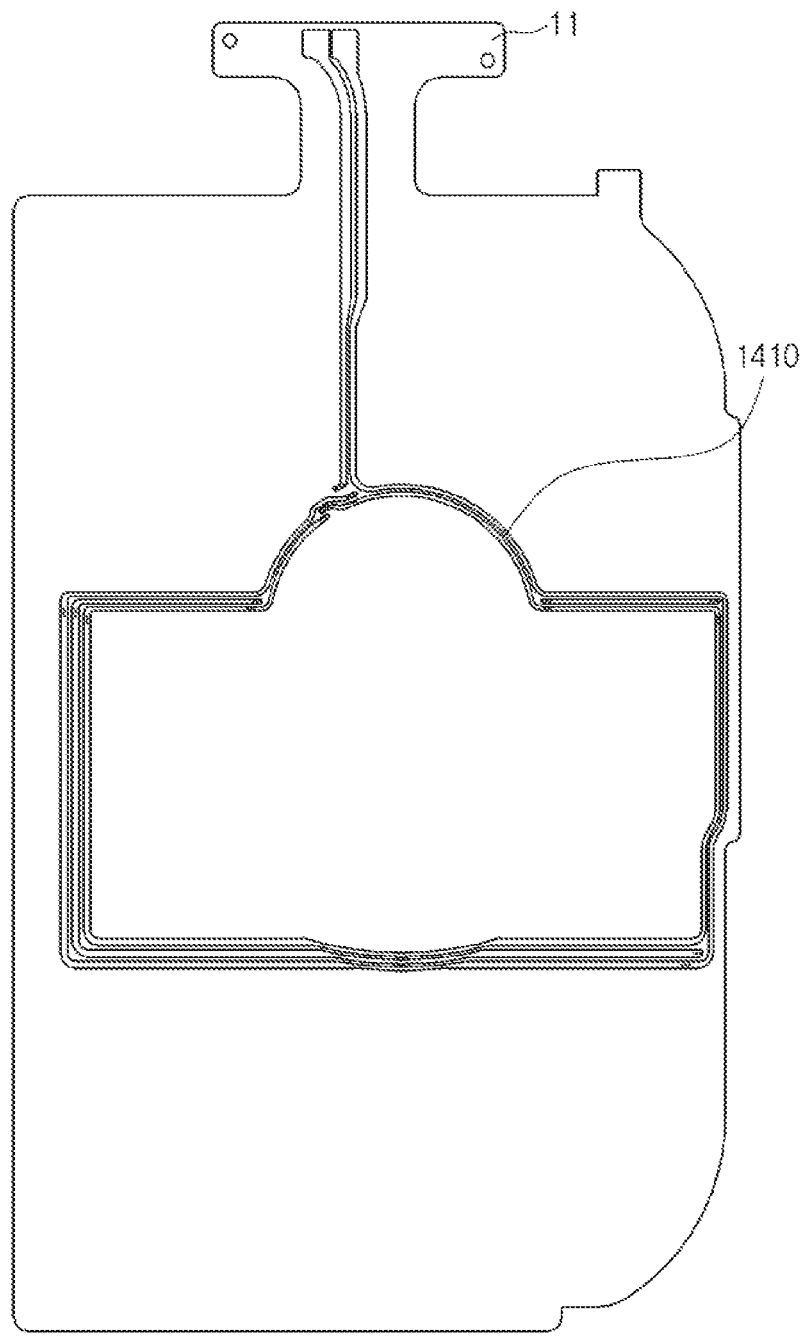
FIG. 14 is a plan view illustrating one surface of a first wireless communications coil, such as the one illustrated in FIG. 8.
Figure 15:
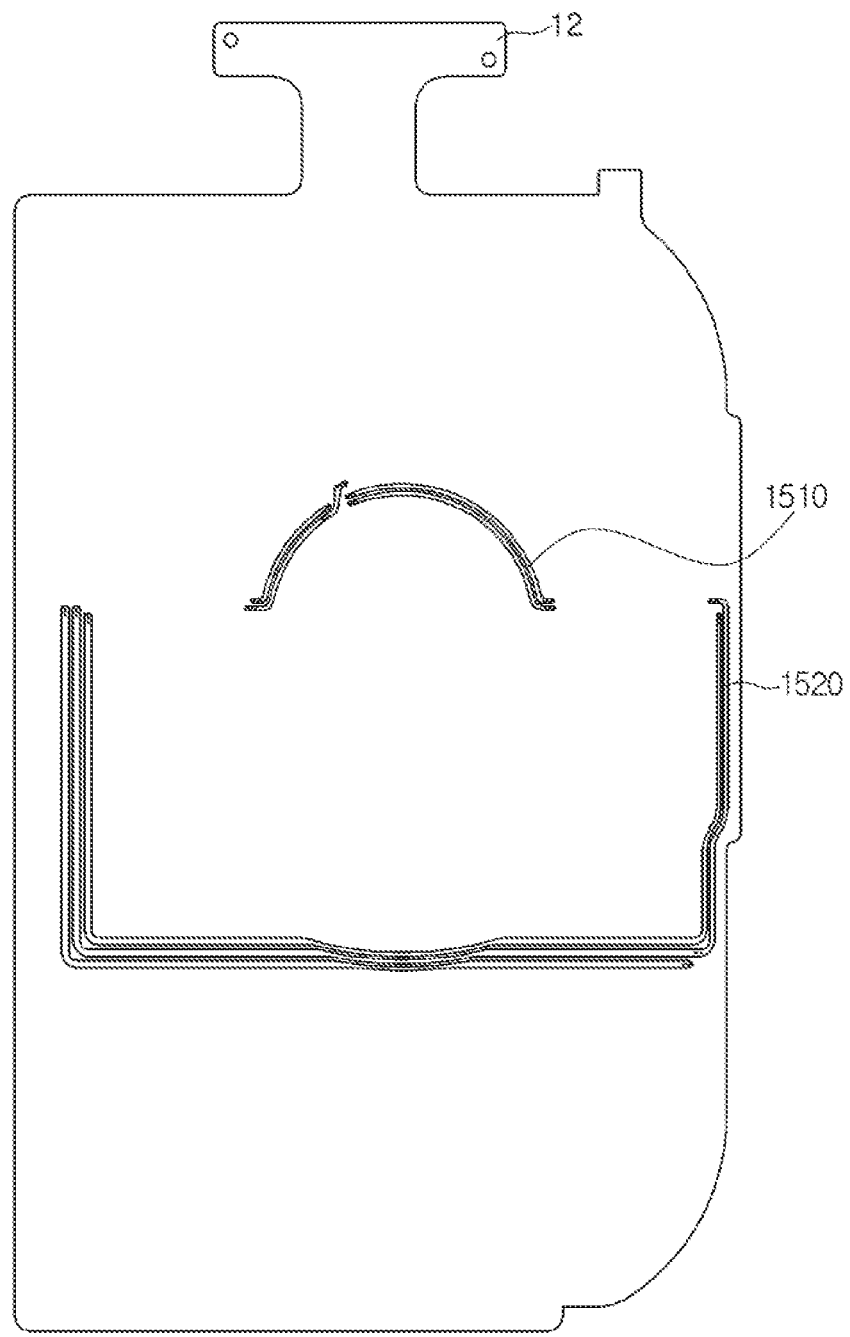
FIG. 15 is a bottom view illustrating another surface of a first wireless communications coil, such as the one illustrated in FIG. 9.

FIG. 14 is a plan view illustrating one surface of the first wireless communications coil illustrated in FIG. 8 and FIG. 15 is a bottom view illustrating the other surface of the first wireless communications coil illustrated in FIG. 9.

Referring to FIG. 14, the first wireless communications coil 121 (FIG. 8) includes a first coil pattern 1410 on one surface 11 of the substrate as illustrated. The first coil pattern 1410 is one or a plurality of patterns which are electrically connected. As illustrated in FIGS. 8 and 10, because wireless charging coils are spaced apart from each other on one surface 11 of the substrate, the first coil pattern 1410 is electrically connected through the spaced regions between disconnected portions.

Referring to FIG. 15, the first wireless communications coil includes second coil patterns 1510 and 1520, separated from each other on the other surface 12 of the substrate. Because the wireless charging coil is formed in a connected pattern on the other surface 12 of the substrate, the first wireless communications coil is not be formed on a region so as to avoid contact with the connected pattern of the wireless charging coil, and may consequently include the second coil patterns 1510 and 1520, separated from each other.

Similarly, the first wireless communications coil also forms coils using both surfaces of the substrate, and this is to form the wireless charging coil or the second wireless communications coil using space created by disconnected regions of the disconnected coil patterns on one surface of the substrate.

Hereinafter, another embodiment of the coil module is described with reference to FIGS. 16 through 19.

FIGS. 16 through 19 schematize the coil without classifying one surface and the other surface of the substrate 200, for clarity, but it is easily understood from the description of FIGS. 4 through 15 that the coil is bypassed through one surface or the other surface of the substrate (and may share a portion of coil) in a region in which the coils are overlapped with each other.

Figure 16:
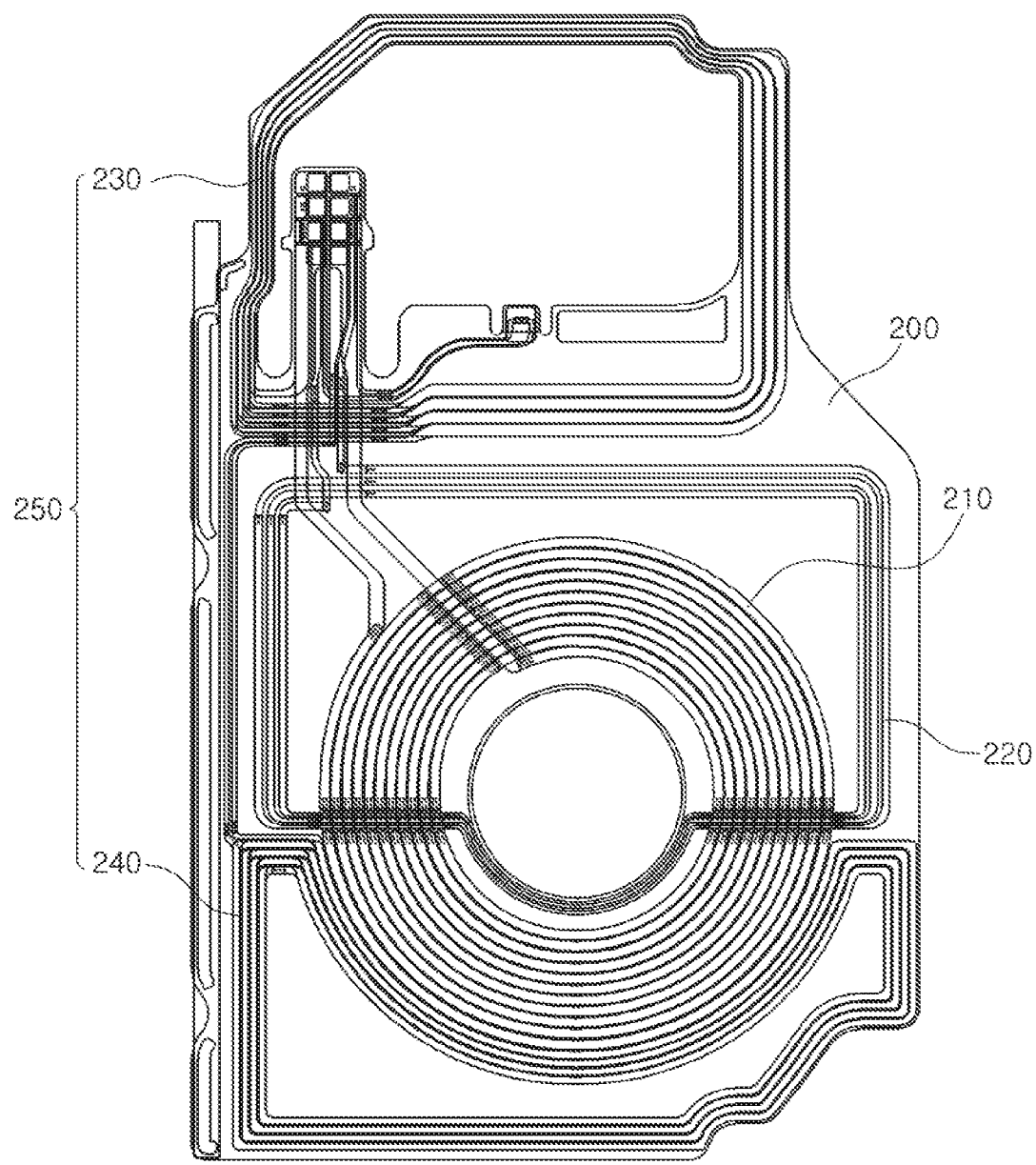
FIG. 16 is a diagram illustrating a coil module according to another embodiment.

FIG. 16 is a diagram illustrating a coil module according to another embodiment.

Referring to FIG. 16, the coil module, and the wireless power receiver using the same, include a wireless charging coil 210, a first wireless communications coil 220, and a second wireless communications coil 250 formed on the substrate 200.

Figure 17:
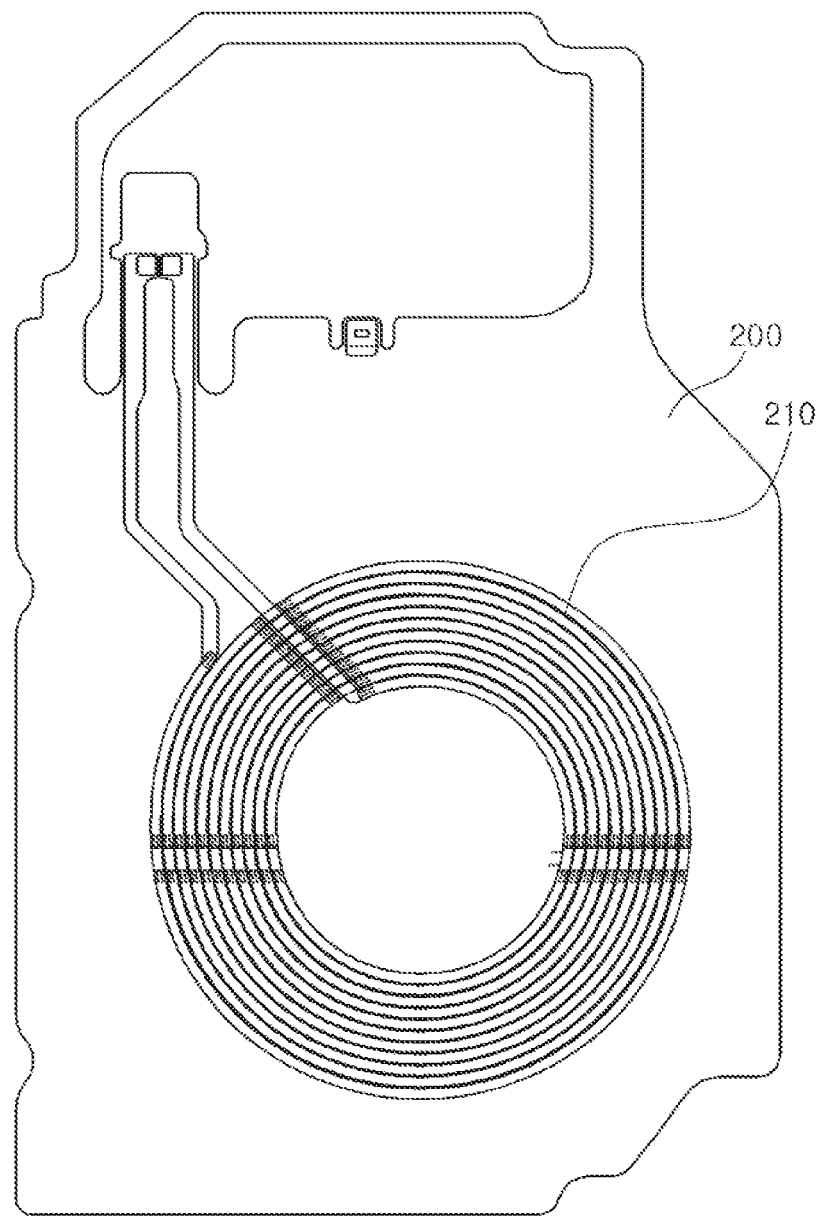
FIG. 17 is a diagram illustrating a wireless charging coil, such as the one illustrated in FIG. 16.

FIG. 17 is a diagram illustrating the wireless charging coil illustrated in FIG. 16. As illustrated, the wireless charging coil 210 is formed in the central portion of the substrate 200. This is to more easily secure a sufficient area for the number windings for wireless charging, amongst other beneficial features. As described above, the wireless charging coil 210 is configured to support various wireless charging standards.

Figure 18:
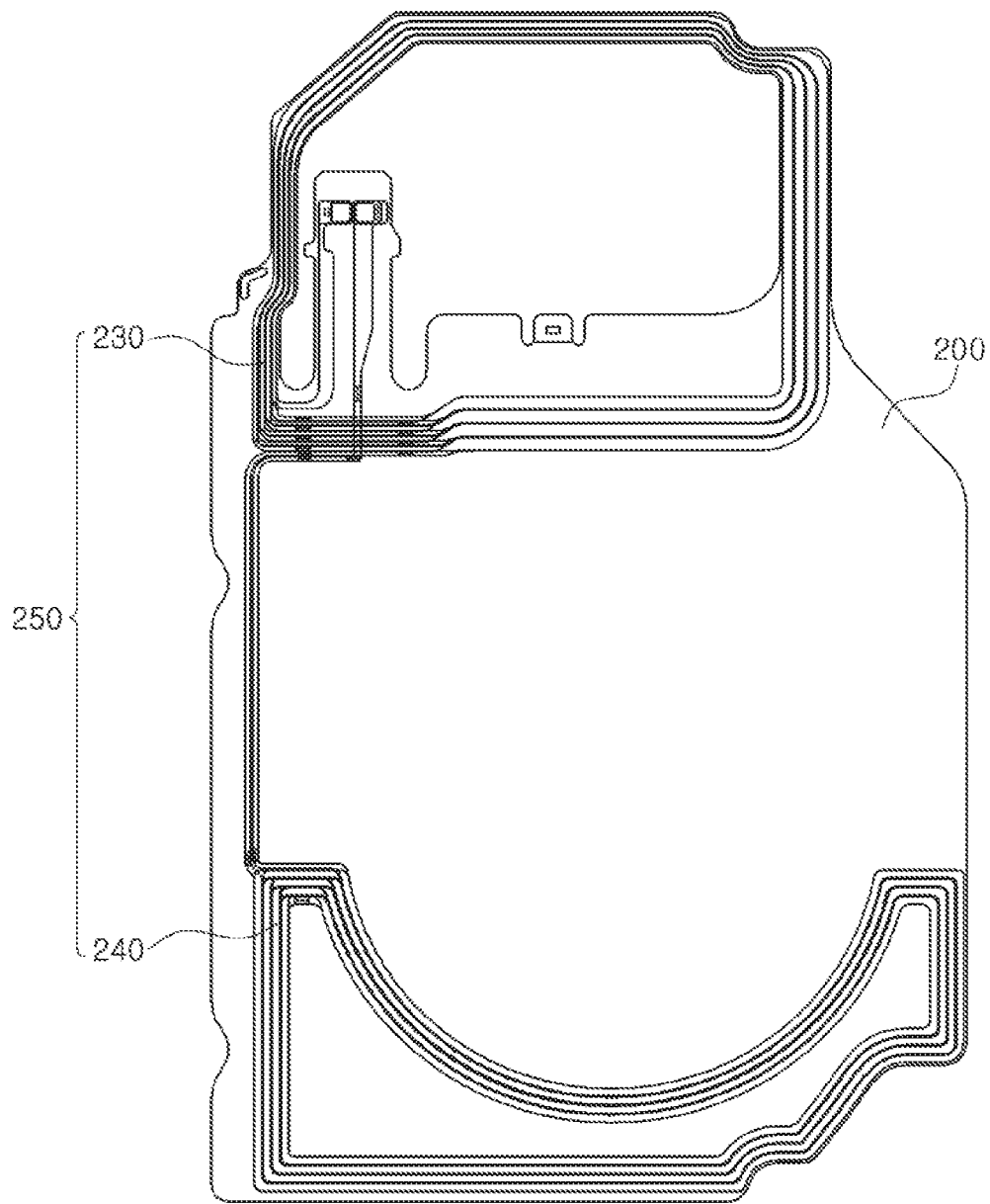
FIG. 18 is a diagram illustrating a second wireless communications coil, such as the one illustrated in FIG. 16.

FIG. 18 is a diagram illustrating a second wireless communications coil 250 illustrated in FIG. 16.

The second wireless communications coil 250 includes two coil parts, spaced apart from each other, that is, the first coil part 230 and the second coil part 240. The first coil part 230 and the second coil part 240 are connected to each other in series, or may also be connected to each other in parallel.

As described above, the first coil part 230 and the second coil part 240 included in the second wireless communications coil 250 collectively form a single magnetic field substantially spanning the length of the substrate 200.

Figure 19:
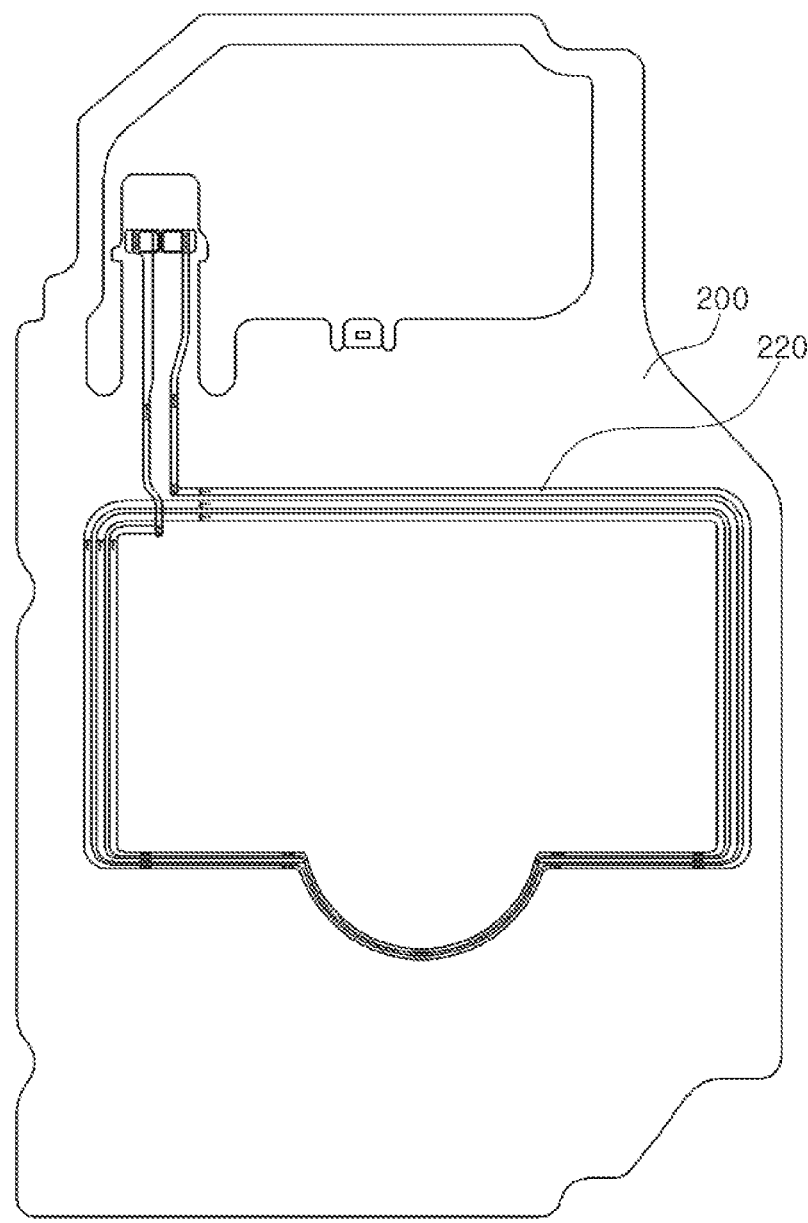
FIG. 19 is a diagram illustrating a first wireless communications coil, such as the one illustrated in FIG. 16.

FIG. 19 is a diagram illustrating a first wireless communications coil illustrated in FIG. 16, and the first wireless communications coil is overlapped with the wireless charging coil 210 in a region. However, it is understood from the detailed description that the first wireless communications coil 220 and the wireless charging coil 210 may be formed on different surfaces of the substrate 200 so as not to physically contact with each other.

Figure 20:
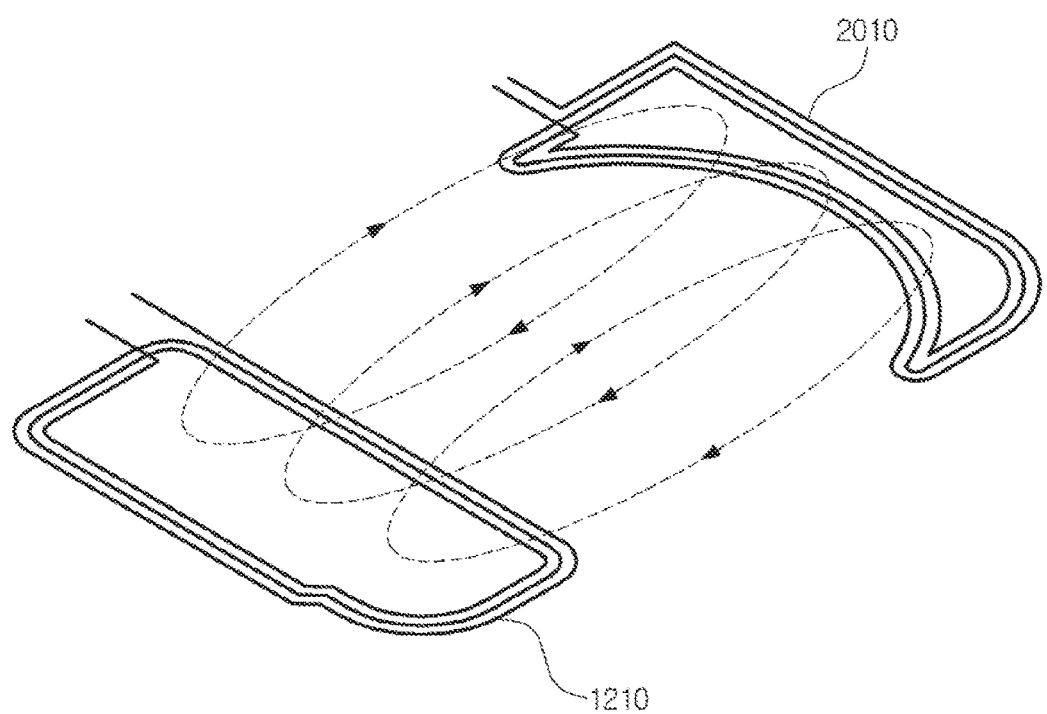
FIG. 20 is a reference view illustrating an operation of a second wireless communications coil, such as the one illustrated in FIG. 4 or FIG. 16.

FIG. 20 is a reference view illustrating an operation of the second wireless communications coil illustrated in FIG. 4 or 16.

Referring to FIG. 20, the second wireless communications coil includes a first coil part 2010, and a second coil part 2020 formed to be spaced apart from the first coil part. According to an embodiment, a metal plate is positioned between the first coil 2010 and the second coil 2020.

The first coil 2010 and the second coil 2020 collectively form a single magnetic field. As illustrated, the dotted lines show at least a portion of a plurality of magnetic lines of force representing the magnetic field formed between the two coils. That is, the dotted lines illustrate the magnetic field formed between the two coils.

As such, the magnetic field is formed by interaction between the magnetic field formed by the first coil 2010 and the magnetic field formed by the second coil 2020. For example, the magnetic field formed by the first coil 2010 and the magnetic field formed by the second coil 2020 are configured to mutually reinforce each other in a direction which is parallel to the two coils, that is, a direction which is directed from the first coil to the second coil in the illustrated example, and thus an extended type of magnetic field passing through both of the two coils such as the illustrated magnetic line of force is formed.

The magnetic field formed between the two coils is configured to have a closed loop shape that passes through at least regions of the first coil 2010 and at least regions of the second coil 2020. In an illustrated example, the magnetic field is illustrated as a closed loop that passes through the center of the first coil 2010 and the center of the second coil 2020.

That is, referring to the illustrated example, the magnetic line of force coupled to both of the two coils penetrates upwardly through the first coil 2010, moves in a direction from the first coil 2010 to the second coil 2020, penetrates downwardly through the second coil 2020, and moves in a direction from the second coil 2020 to the first coil 2010.

Because the magnetic field formed by the first coil 2010 and the magnetic field formed by the second coil 2020 are reinforced by each other in the horizontal direction of the two coils, the magnetic field formed by both of the two coils is formed in the closed loop shape that passes through both of the two coils.

As such, since the magnetic lines of force of the closed loop that passes through the two coils exist within the magnetic field formed through the two coils between the two coils, the receiving coil is smoothly magnetically coupled to the magnetic field even in a case in which the receiving coil is positioned in any position between the two coils.

As set forth above, according to the embodiments, the coil module and the wireless power receiver using the same may increase the spatial efficiency of various kinds of coils.

While embodiments have been shown and described above, it will be apparent to those skilled in the art that modifications and variations could be made without departing from the scope of the present invention as defined by the appended claims.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there are no other elements intervening therebetween.

As used herein, the term "and/or" includes any one and any combination of any two or more of the associated listed items.

Although terms such as "first" and "second," may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing and modifications due to differing frequency bands.

The features of the examples described herein may be combined in various ways as will be apparent after an understanding of the disclosure of this application. Further, although the examples described herein have a variety of configurations, other configurations are possible as will be apparent after an understanding of the disclosure of this application.

The controller 340 in FIG. 3 that performs the operations described in this application are implemented by hardware components. Examples of hardware components that may be used to perform the operations described in this application, where appropriate, include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil module comprising:
a substrate;
a wireless charging coil formed in a substantially central portion of the substrate positioned on both surfaces of the substrate; and
a first wireless communications coil which does not directly contact the wireless charging coil and is formed in the substantially central portion of the substrate on both surfaces of the substrate,
wherein, in a region of the substrate in which the wireless charging coil and the first wireless communications coil are overlapped with each other, the wireless charging coil is formed on one surface of the region and the first wireless communications coil is formed on the other surface of the region, respectively.

2. The coil module of claim 1, wherein the wireless charging coil comprises:
a plurality of first coil patterns, disconnected from each other, formed on one surface of the substrate;
a second coil pattern formed on the other surface of the substrate; and
a plurality of vias connecting the plurality of first coil patterns and the second coil pattern to each other.

3. The coil module of claim 2, wherein the first wireless communications coil comprises first coil patterns, connected to each other, formed on one surface of the substrate.

4. The coil module of claim 1, further comprising a second wireless communications coil comprising a first coil part formed to be wound multiple times on one side of the central portion, and a second coil part formed to be wound multiple times on the other side of the central portion.

5. The coil module of claim 4, wherein the second wireless communications coil forms a first magnetic field, and
at least a portion of a plurality of magnetic lines of force representing the first magnetic field have a closed loop shape that passes through the center of the first coil part and the center of the second coil part.

6. The coil module of claim 4, wherein the wireless charging coil is formed to be wound to have a substantially circular shape,
the first coil part is wound to have an asymmetrical shape, and
a portion of the first coil part has a shape corresponding to a portion of the substantially circular shape.

7. The coil module of claim 4, wherein, in a first region of the substrate in which the wireless charging coil and the second wireless communications coil are overlapped with each other, the wireless charging coil is formed on one surface of the first region and the second wireless communications coil is formed on the other surface of the first region, respectively.

8. The coil module of claim 1, wherein the substrate comprises a terminal part formed to protrude on one side thereof, and
both terminals of the wireless charging coil and both terminals of the first wireless communications coils are formed on one surface of the terminal part.

9. A wireless power receiver wirelessly receiving power or communications data through a resonator comprising a coil module, wherein
the coil module comprises:
a substrate;
a wireless charging coil formed in a substantially central portion of the substrate through both surfaces of the substrate; and
a first wireless communications coil which does not directly contact the wireless charging coil and is formed in the substantially central portion of the substrate through both surfaces of the substrate,
wherein, in a region of the substrate in which the wireless charging coil and the first wireless communications coil are overlapped with each other, the wireless charging coil is formed on one surface of the region and the first wireless communications coil is formed on the other surface of the region, respectively.

10. The wireless power receiver of claim 9, wherein the wireless charging coil comprises:
a plurality of first coil patterns, disconnected from each other, formed on one surface of the substrate;
a second coil pattern formed on the other surface of the substrate; and
a plurality of vias connecting the plurality of first coil patterns and the second coil pattern to each other.

11. The wireless power receiver of claim 10, wherein the first wireless communications coil comprises first coil patterns, connected to each other, formed on one surface of the substrate.

12. The wireless power receiver of claim 9, wherein the coil module further comprises a second wireless communications coil comprising a first coil part formed to be wound multiple times on one side of the central portion, and a second coil part formed to be wound multiple times on the other side of the central portion.

13. The wireless power receiver of claim 12, wherein the second wireless communications coil forms a first magnetic field, and
at least a portion of a plurality of magnetic lines of force representing the first magnetic field have a closed loop shape that passes through the center of the first coil part and the center of the second coil part.

14. The wireless power receiver of claim 12, wherein the wireless charging coil is formed to be wound to have a substantially circular shape,
the first coil part is wound to have an asymmetrical shape, and
a portion of the first coil has a shape substantially corresponding to a portion of the circular shape.

15. The wireless power receiver of claim 12, wherein in a first region of the substrate in which the wireless charging coil and the second wireless communications coil are overlapped with each other, the wireless charging coil is formed on one surface of the first region and the second wireless communications coil is formed on the other surface of the first region, respectively.

16. The wireless power receiver of claim 9, wherein the substrate comprises a terminal part formed to protrude on one side thereof, and
both terminals of the wireless charging coil and both terminals of the first wireless communications coils are formed on one surface of the terminal part.

* * * * *